United States Patent [19]

Noji et al.

[11] 4,164,401
[45] Aug. 14, 1979

[54] CURVED ORIFICE PLATE FOR FORMING GLASS FIBERS

[75] Inventors: Toshio Noji; Hiroaki Shono; Isao Wakasa, all of Fukushima, Japan

[73] Assignee: Nitto Boseki Co., Ltd., Fukushima, Japan

[21] Appl. No.: 944,535

[22] Filed: Sep. 21, 1978

Related U.S. Application Data

[63] Continuation of Ser. No. 808,948, Jun. 22, 1977, abandoned.

[30] Foreign Application Priority Data

Jun. 30, 1976 [JP] Japan ................................ 51/77420

[51] Int. Cl.$^2$ .......................................... C03B 37/02
[52] U.S. Cl. ...................................... 65/1; 65/11 W; 65/12
[58] Field of Search .................... 65/1, 2, 11 W, 12

[56] References Cited

U.S. PATENT DOCUMENTS

| | | | |
|---|---|---|---|
| 2,947,028 | 8/1960 | Slayter | 65/12 |
| 3,508,892 | 4/1970 | McCoppin | 65/1 X |
| 3,573,014 | 3/1971 | Strickland et al. | 65/1 |
| 3,867,119 | 2/1975 | Kasuga et al. | 65/12 |
| 3,988,135 | 10/1976 | Coggin | 65/2 X |

*Primary Examiner*—Robert L. Lindsay, Jr.
*Attorney, Agent, or Firm*—Sughrue, Rothwell, Mion, Zinn and Macpeak

[57] ABSTRACT

The orifice plate 2 in the bottom of a bushing 1 is uniformly inwardly curved in a concave manner, whereby its resistance to outward deformation or sagging under the weight of molten glass in the bushing and the tension of glass filaments 5 withdrawn therethrough is greatly increased. The plate may be rectangular or circular, i.e. arch-shaped or domed, and may be further strengthened by reinforcing bars 7 secured to the interior side walls of the bushing and to the crown portion of the plate.

6 Claims, 3 Drawing Figures

4,164,401

CURVED ORIFICE PLATE FOR FORMING GLASS FIBERS

This is a continuation of application Ser. No. 808,948, filed June 22, 1977, now abandoned.

BACKGROUND OF THE INVENTION

This invention relates to an orifice plate construction for a glass fiber forming bushing.

In the manufacture of glass fibers, a bushing with a bottom plate having 400 to 2000 minute orifices therein is charged with molten glass, which then flows down through the orifices to draw the glass into fibers or filaments. The orifice plate typically becomes downwardly deformed in a convex manner during prolonged usage, however, owing to the weight of the molten glass in the bushing, the tension of the withdrawn fibers, and the high operating temperatures of from 1100° C. to 1300° C. Such deformation causes a difference in heat radiation between the cones formed in the peripheral areas of the orifice plate and those formed in the central area thereof, and in addition the peripheral cones tend to drift or migrate toward the central area of the deformed orifice plate. This reduces the stability of the cones and increases filament breakage, and when adjacent cones merge or become joined together it is difficult to restore their separation.

To overcome this difficulty the distance between the orifices or the thickness of the orifice plate may be increased, or the plate may be strengthened by reinforcing ribs. These conventional solutions are disadvantageous, however, in that when the size of the orifice plate is increased the size of the overall bushing is correspondingly increased. As a result it is difficult to uniformly heat the molten glass and its orifice flow properties therefore become uneven, which leads to filament breakage and an attendant reduction in productivity. Even when the filaments do not break their diameters vary, which reduces the strength of the fibers. In addition, as the bushings are made of platinum, any increase in their size involves corresponding increases in equipment investment and in the cost of the filaments produced.

An alternative technique has been to use a relatively smaller bushing having 4000 to 6000 orifices in the flat bottom plate at intervals of less than 3 mm, and to direct an air flow at the bottom of the orifice plate to cool the cones of molten glass and increase their viscosity, thus preventing the cones from joining together. This technique increases productivity, but suffers from the disadvantage that as the orifice density is increased the orifice plate becomes necessarily weakened, which enhances its convex deformation tendency. Such deformation or curvature results in a non-uniform cooling effect from the air flow, which causes the fibers to break off, vary in diameter, etc.

Thus, in spite of the many and varied prior art approaches, orifice plate deformation remains a significant problem in the industry.

SUMMARY OF THE INVENTION

Accordingly, an object of this invention is to overcome the above-described difficulties accompanying conventional glass fiber manufacturing techniques by providing a bushing in which orifice plate deformation is prevented and in which the orifice density can be increased without weakening the bushing or increasing its dimensions.

Another object of the invention is to provide such a bushing in which the cones of molten glass flowing out of the orifice plate are more uniform and stable, thereby enabling increased production efficiency.

These and other objects are achieved by curving the orifice plate inwardly in a uniform concave manner, thereby greatly increasing its strength, rigidity, and resistance to outward deformation, even under extreme and prolonged operating conditions. Such inward curving or bending also increases the effective surface area of the orifice plate, which enables the number and density of the orifices to be increased, or alternatively the size of the plate and bushing may be reduced without reducing the total number of orifices.

When the concave orifice plate of the invention is applied to an air blowing process, the cooling air is found to flow more smoothly and uniformly over the inwardly curved surface of the plate, whereby the cooling effect on the cones is much evener and the filament diameters are thus more uniform. The orifice plate may be either rectangular or circular, whereby its inward curvature is either arch-shaped or dome-shaped, respectively.

DETAILED DESCRIPTION OF THE PREFERRED EMBODIMENTS

Figure 1:
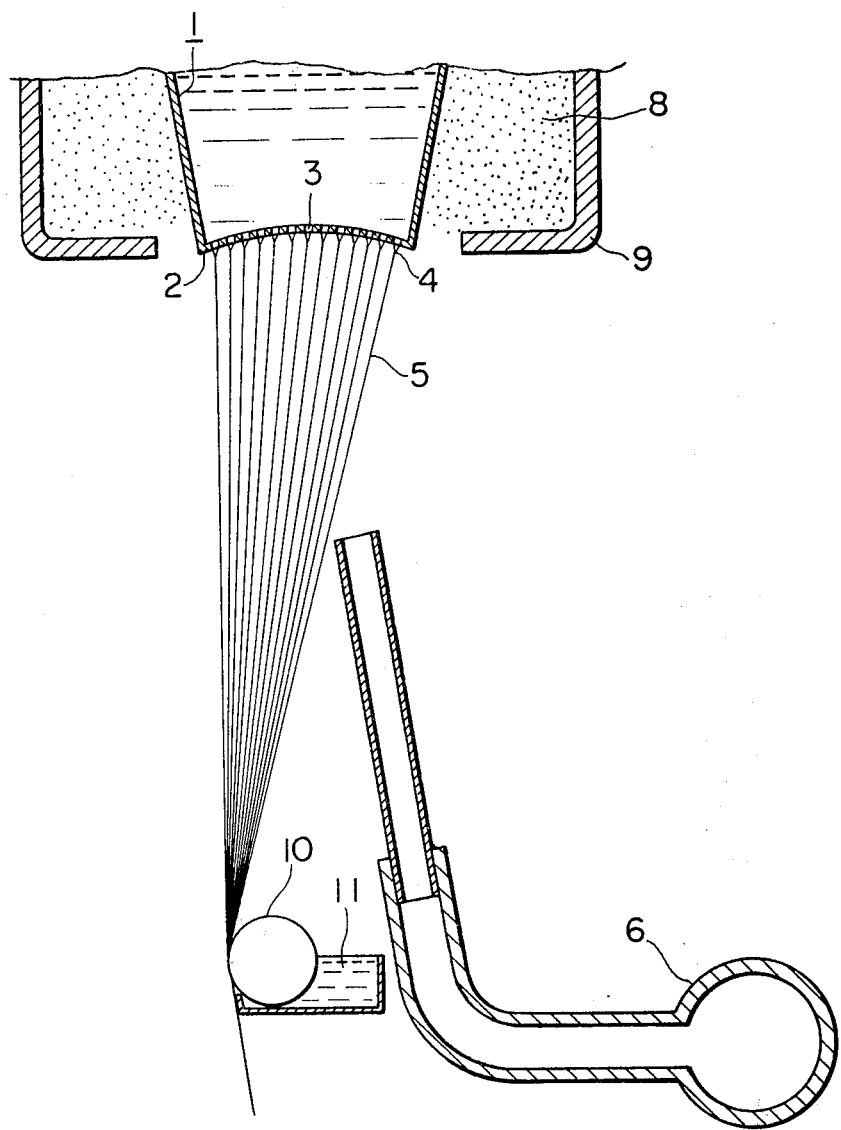
FIG. 1 shows a sectional elevation of a glass fiber forming apparatus employing a forming bushing having a concave or arch-shaped orifice plate according to this invention.

Referring now to the drawings, FIG. 1 shows glass fibers being withdrawn at high density through a bushing 1 having an inwardly arched or concave rectangular orifice plate 2 extending across the bottom of the bushing perpendicular to the longitudinal bushing axis or filament withdrawal direction. Molten glass in the bushing flows out through a plurality of circular orifices 3 in the plate 2, forming cones 4 which are drawn downwardly into glass fibers or filaments 5. The relatively small bushing in FIG. 1 has been recently developed, and the plate 2 has so many orifices 3 that under ordinary conditions the cones 4 formed on the lower surface of the plate would merge and join together to preclude separate fiber formation. As shown in FIG. 1, however, a flow of cooling air is directed at the lower surface of the orifice plate from a blower 6 to increase the viscosity of the cones and thereby prevent their unwanted joining or merging.

The orifices in the plate 2 have an ordered or symmetrical geometric arrangement, in the manner of mesh intersections, for example. If the orifice plate is flat as in a conventional bushing, it is thus liable to bend or deform downwardly in a convex manner due to the weight of the molten glass and the tension of the glass fibers being withdrawn. According to this invention, however, the orifice plate is curved inwardly or concave, and therefore has a considerably increased resistance against any such weight deformation. Furthermore, with such curvature the surface area of the orifice plate is increased as compared with that of a flat plate mounted in the same bushing, and the number of orifices can thus be correspondingly increased.

Figure 2:
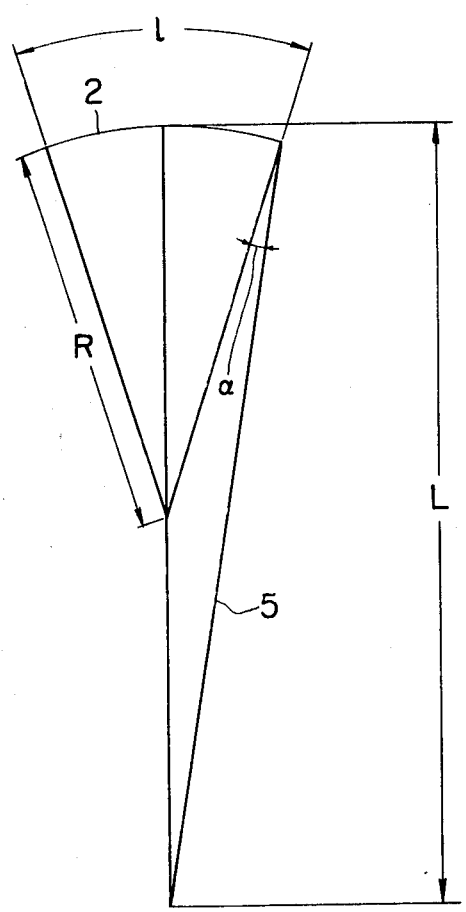
FIG. 2 shows a geometric diagram for explaining a method of determining the radius of curvature of the orifice plate according to the invention.

The preferred radius of curvature range of the orifice plate is, considering material dynamics and the actual fiber forming conditions, determined from the distance L between the vertex of the orifice plate and the collection point of the filaments 5, the span or width 1 of the orifice plate, and the angle α between the axial direction of an outermost orifice and the lie of a filament 5 drawn therethrough. According to experimental results it has been found that the angle α is preferably less than 15 degrees, whereby the radius of curvature R of the orifice plate is within the range of from 35 mm to 200 mm. These dimensional relationships are illustrated in FIG. 2. When the radius of curvature is less than 35 mm the workability or uniform bendability of the orifice plate is reduced to a difficult level, and in addition the cones of molten glass flowing out of the orifices are prone to sag or migrate toward the outer edges of the plate and join together. When the radius of curvature is more than 200 mm, on the other hand, the downward deformation resistance of the plate becomes to low and it is subject to the same weight sagging drawback as a conventional flat plate.

The plate 2 is produced by drilling orifices of predetermined diameter and spacing in a flat platinum plate and then bending it to a desired, uniform curvature in a cold press or the like, whereby the axes of all of the orifices are directed at the center of curvature. As a result, angular fluctuations between the directions of the orifice axes and attendant filament tension differences are less than in a conventional flat orifice plate, and each cone is more uniform in shape which increases the fiber forming stability. Furthermore, the air applied to the lower surface of the orifice plate flows more smoothly between the cones owing to the plate curvature, which enhances the cooling effect.

In a comparative test a conventional bushing with a flat bottom plate having 2000 orifices drilled therein at a density of 70 orifices/cm² and a bushing with a curved orifice plate having the same number and density of orifices were operated together to withdraw glass fibers at a rate of 800 g/min. The service life of the flat orifice plate was 52 days, while that of the curved orifice plate according to the invention was more than 200 days.

Reference numeral 8 designates a heat insulating packing, such as asbestos or the like, disposed around the bushing 1 within a frame cup 9 having a bottom opening to accomodate the orifice plate. A coating roller 10 is disposed at the filament collection point for applying a sizing agent 11 to the filaments to reduce friction and prevent their adherence to each other. The collection point is shown as being slightly offset from the bushing axis in order to further enhance the uniformity of the cooling air flow from the blower 6.

Figure 3:
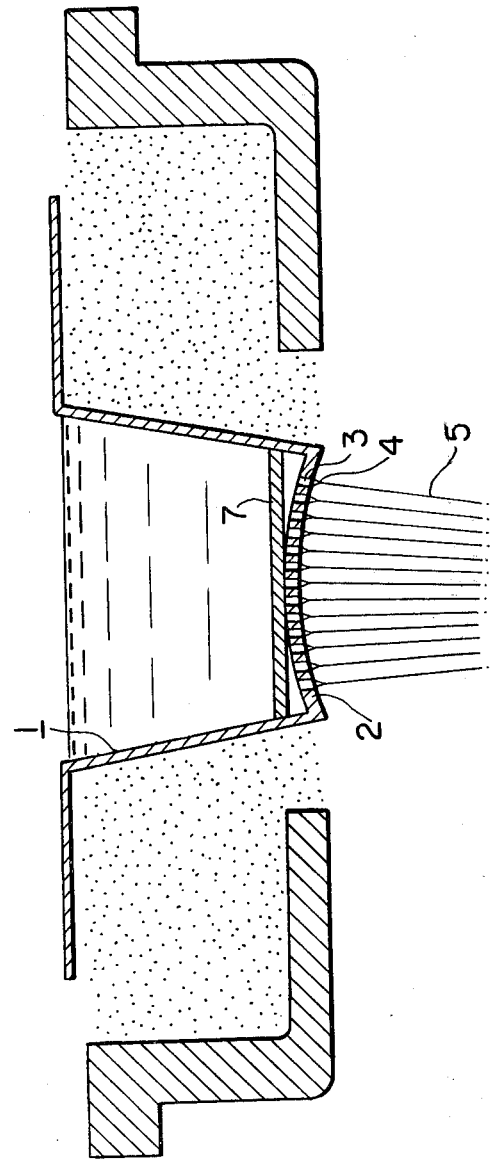
FIG. 3 shows an enlarged sectional elevation of a modified bushing according to the invention, in which the orifice plate is reinforced.

FIG. 3 shows a modified construction wherein one or more reinforcing bars 7 are disposed in parallel between the opposite interior walls of the bushing. Both ends of each bar are fixedly secured to the walls and to the top or crown portion of the orifice plate 2. The bars may be thin flat plates or rods, and increase the deformation resistance of the orifice plate to the point where a service life of approximately one year may be expected. Some orifices in the top portion of the plate are closed or sealed off when the reinforcing bars are welded thereto, but their number is very small when compared with the total number of orifices and the effects thereof are thus negligible.

Although the invention has been described with reference to an arched, rectangular orifice plate, it is equally applicable to a circular orifice plate bent upwardly in the form of a dome, in which case a suitable number of reinforcing bars may be mounted between the top portion of the dome and the side walls of the bushing.

Because of their strengthened, curved construction, the orifice plates according to the invention can be made smaller in size and their service life increased from four to seven times that of conventional plates, without any reduction in the total number of orifices owing to the increased acceptable density thereof. Accordingly, the amount of platinum used in manufacturing the bushings can be reduced, which constitutes a further economic advantage.

What is claimed is:

1. In a glass filament forming bushing including a molten glass container having a bottom plate provided with a plurality of closely spaced filament withdrawal non-tip orifices, and means to direct a flow of cooling air to the outer surface of the bottom plate, the improvement characterized by:

the bottom plate being inwardly curved in a concave manner to increase its resistance to outward deformation as a consequence of the loading thereon from the weight of molten glass in the container and the tension resulting from the withdrawn filaments, said bottom plate having a uniform radius of curvature in the range of 35 mm to 200 mm and the angle between the axis of an outermost orifice therein and the direction of withdrawal of a filament drawn therethrough is less than 15°.

2. A bushing as defined in claim 1, further comprising at least one elongated reinforcing member (7) extending across the container and having its ends secured to the opposite interior side walls thereof and its central portion secured to a crown portion of the bottom plate.

3. A bushing as defined in claim 1, wherein the bottom plate is rectangular and arch-shaped.

4. A bushing as defined in claim 2, wherein the bottom plate is rectangular and arch-shaped.

5. A bushing as defined in claim 1, wherein the bottom plate is circular and dome-shaped.

6. A bushing as defined in claim 2, wherein the bottom plate is circular and dome-shaped.

* * * * *